US009693095B2

(12) United States Patent
Perron et al.

(10) Patent No.: US 9,693,095 B2
(45) Date of Patent: Jun. 27, 2017

(54) DEVICE AND METHOD FOR COMPOSING PROGRAMMES FROM DIFFERENT SOURCES IN BASEBAND

(71) Applicant: FRANCE BREVETS, Paris (FR)

(72) Inventors: Claude Perron, Betton (FR); Benoit Guerin, Rennes (FR); Guillaume Cornard, Montreuil sur Ille (FR)

(73) Assignee: HARMONIC INC., San Jose, CA (US)

( * ) Notice: Subject to any disclaimer, the term of this patent is extended or adjusted under 35 U.S.C. 154(b) by 38 days.

(21) Appl. No.: 14/310,047

(22) Filed: Jun. 20, 2014

(65) Prior Publication Data

US 2014/0380394 A1    Dec. 25, 2014

(30) Foreign Application Priority Data

Jun. 21, 2013   (FR) ...................................... 13 55957

(51) Int. Cl.
*H04N 7/173*   (2011.01)
*H04N 7/16*    (2011.01)
(Continued)

(52) U.S. Cl.
CPC .............. *H04N 21/44* (2013.01); *H04N 19/00* (2013.01); *H04N 21/2365* (2013.01); *H04N 21/2368* (2013.01); *H04N 21/23424* (2013.01); *H04N 21/2665* (2013.01); *H04N 21/43* (2013.01); *H04N 21/44016* (2013.01); *H04N 21/812* (2013.01); *H04N 21/8133* (2013.01)

(58) Field of Classification Search
CPC .. H04N 21/44; H04N 21/44016; H04N 19/00; H04N 19/103
See application file for complete search history.

(56) References Cited

U.S. PATENT DOCUMENTS

| 8,755,438 B2* | 6/2014 | Layachi ........... H04N 19/00472 375/240.15 |
| 2009/0068941 A1 | 3/2009 | Barroso |
| 2009/0069021 A1* | 3/2009 | Barroso ............... H04H 20/103 455/450 |

FOREIGN PATENT DOCUMENTS

| WO | WO 2006055243 A2 | 5/2006 |
| WO | WO 2013008255 A2 | 1/2013 |

OTHER PUBLICATIONS

Roma et al., "Fast Transcoding Architecture for Insertion of non-regular Shaped Objects in the Compressed DCT-domain", Elsevier 2003.*

(Continued)

*Primary Examiner* — James R Marandi
(74) *Attorney, Agent, or Firm* — Meagher Emanuel Laks Goldberg & Liao, LLP

(57) ABSTRACT

The invention concerns a device for inserting additional video content (inlays, secondary programs) into a main video program. Said device works in baseband within a single encoding box under the control of a common supervisor. The supervisor is configured to pass metadata associated with the images to the coder, said metadata comprising temporal, spatial and dynamic data relating to the planning of the insertion, and analysis data for the image files, which analysis data have been produced prior to the insertion. The coder receives said metadata and is configured to deduce therefrom optimization strategies for the coding that are implemented by line coding and file coding processes that are capable of being carried out simultaneously or sequentially.

12 Claims, 5 Drawing Sheets

(51) Int. Cl.
*H04N 21/44* (2011.01)
*H04N 21/43* (2011.01)
*H04N 19/00* (2014.01)
*H04N 21/234* (2011.01)
*H04N 21/2365* (2011.01)
*H04N 21/2368* (2011.01)
*H04N 21/2665* (2011.01)
*H04N 21/81* (2011.01)

(56) References Cited

OTHER PUBLICATIONS

M.J. Montpetit et al. The Future of IPTV: Adding Social Networking and Mobility: 10th International Conference on Telecommunications, Contel 2009, IEEE Computer Society USA.
Institut National De La Propriete Industrielle, Mar. 31, 2014—Search Report and Opinion.

* cited by examiner

DEVICE AND METHOD FOR COMPOSING PROGRAMMES FROM DIFFERENT SOURCES IN BASEBAND

FIELD OF THE INVENTION

The present invention belongs to the field of broadcasting video programmes. More precisely, it is used when broadcasters wish to insert additional content (such as advertisements, superimpositions, information banners or subtitles) into programmes prepared by producers.

BACKGROUND PRIOR ART

The broadcasters would be able to perform said insertion in baseband (uncompressed format), provided that they are equipped with the same devices as the production studios. This solution is prohibitive in terms of cost, all the more since it is necessary to provide as many devices as broadcast modes (satellite, terrestrial, cable, ADSL, 4G, etc.). The result is that the broadcasters nominally insert said additional content in compressed format. Owing to this, the synchronization of the main and additional content is approximative, which has a great impact on quality of service.

SUMMARY OF THE INVENTION

The present invention solves this problem, which is not solved by the prior art, by providing a device and a method that allow the insertion of additional content to be performed in baseband and thus allow image-accurate synchronization of the composed content to be obtained without having to multiply the equipment.

To this end, the present invention discloses a broadcasting device for broadcasting video programmes comprising at least one acquisition module for acquiring at least one main programme; at least one production module for producing at least one additional element chosen from a group comprising a secondary programme and an inlay; at least one composition module for composing a programme composed from said at least one additional element and said at least one main programme; at least one coding module for broadcasting said video programme at the output of the composing module over at least one transmission network for video signals wherein the composition module processes the images of the main programme and of the additional element in uncompressed format and the production, composition and coding modules are supervised by a common control module.

Advantageously, the acquisition module comprises at least one decoding submodule for decoding at least one main programme.

Advantageously, the decoding submodule is configured to perform multiple decoding.

Advantageously, the module comprises an integrated stream server configured to provide the decoding module with compressed content and the composition module with graphical or textual content according to a planning performed by an automaton.

Advantageously, the production module comprises a submodule for generating graphical and textual content and a submodule for superimposing said generated content in a main or secondary video programme.

Advantageously, the common control module is configured to receive information relating to said planning from the automaton and to condition said information into metadata that are provided to the coding module.

Advantageously, said metadata comprise elements chosen from a group of data comprising information about a start time, an end time, a position, an occupied surface area, a level of transparency of said additional content.

Advantageously, the production module comprises a submodule for analysing image files constituting the additional elements, said image analysis submodule being configured to produce metadata associated with the images of the additional content, said metadata comprising information concerning intra-image content and estimation of inter-image movement of said additional content.

Advantageously, the image analysis submodule is configured to perform said analysis on all of the additional elements intended for broadcast with a main programme, prior to said broadcast.

Advantageously, the coding module is configured to receive said metadata as an input and to deduce therefrom a coding strategy for the composed programme.

Advantageously, the coding module implements at least one coding process, said at least one coding process being chosen from a group comprising line coding processes and file coding processes.

Advantageously, the device for broadcasting video programmes of the invention is configured to receive the video programmes encapsulated in IP frames and to retransmit them in the same format.

The invention likewise discloses a broadcasting method for broadcasting video programmes comprising at least one step of acquisition of at least one main programme; at least one step of production of at least one additional element chosen from a group comprising a secondary programme and an inlay; at least one step of composition of a programme composed from said at least one additional element and said at least one main programme; at least one step of coding for broadcasting said video programme at the output of the step of composition over at least one transmission network for video signals; wherein the composition step processes the images of the main programme and of the additional element in uncompressed format and in that the production, composition and coding steps are supervised by a common control step.

Advantageously, the common control step receives planning information from a production automaton as an input and conditions said planning information into metadata that are provided to the coding module.

Advantageously, the step of production of additional elements comprises a substep of analysis of the image files constituting the additional elements, said image analysis substep allowing constitution of metadata associated with the images of the additional content, said metadata comprising information concerning intra-image content and estimation of inter-image movement of said additional content.

Advantageously, the coding step receives said metadata as an input and generates a coding strategy for the composed programme on the basis of at least some of this information, said coding strategy being implemented by a process chosen from a group comprising line coding processes and file coding processes.

The invention likewise discloses a device for supervising an encoder for combined video programmes comprising a planning module for the insertion of video streams from at least one additional element chosen from a group comprising a secondary video programme and an image inlay; a production module for producing metadata generated from information belonging to a group of temporal, spatial and dynamic information on the insertion of said additional elements; an analysis module for analysing the image files constituting the additional elements, said module for analysing said image files being configured to generate metadata comprising information concerning intra-image content and estimation of inter-image movement; a selection module for choosing coding strategies wherein at least some of the outputs of the metadata at the output of the planning and image analysis modules are provided for the module for choosing the coding strategies.

BRIEF DESCRIPTION OF THE DRAWINGS

The invention likewise authorizes precise planning of the insertion of the additional content. It also allows identification of the information on the additional content (within an image, or from one image to another), over all of the additional content, and use of this information to optimize the coding of the composed programme, rather than settling for the information relating to the images close to the current image. Moreover, in relation to the baseband configurations of the prior art, the device of the invention is more compact and less energy-intensive.

The invention will be better understood, and the various characteristics and advantages thereof will emerge, from the description that follows for several exemplary embodiments and from the appended figures of the invention, in which.

DETAILED DESCRIPTION OF THE INVENTION

Figure 1:
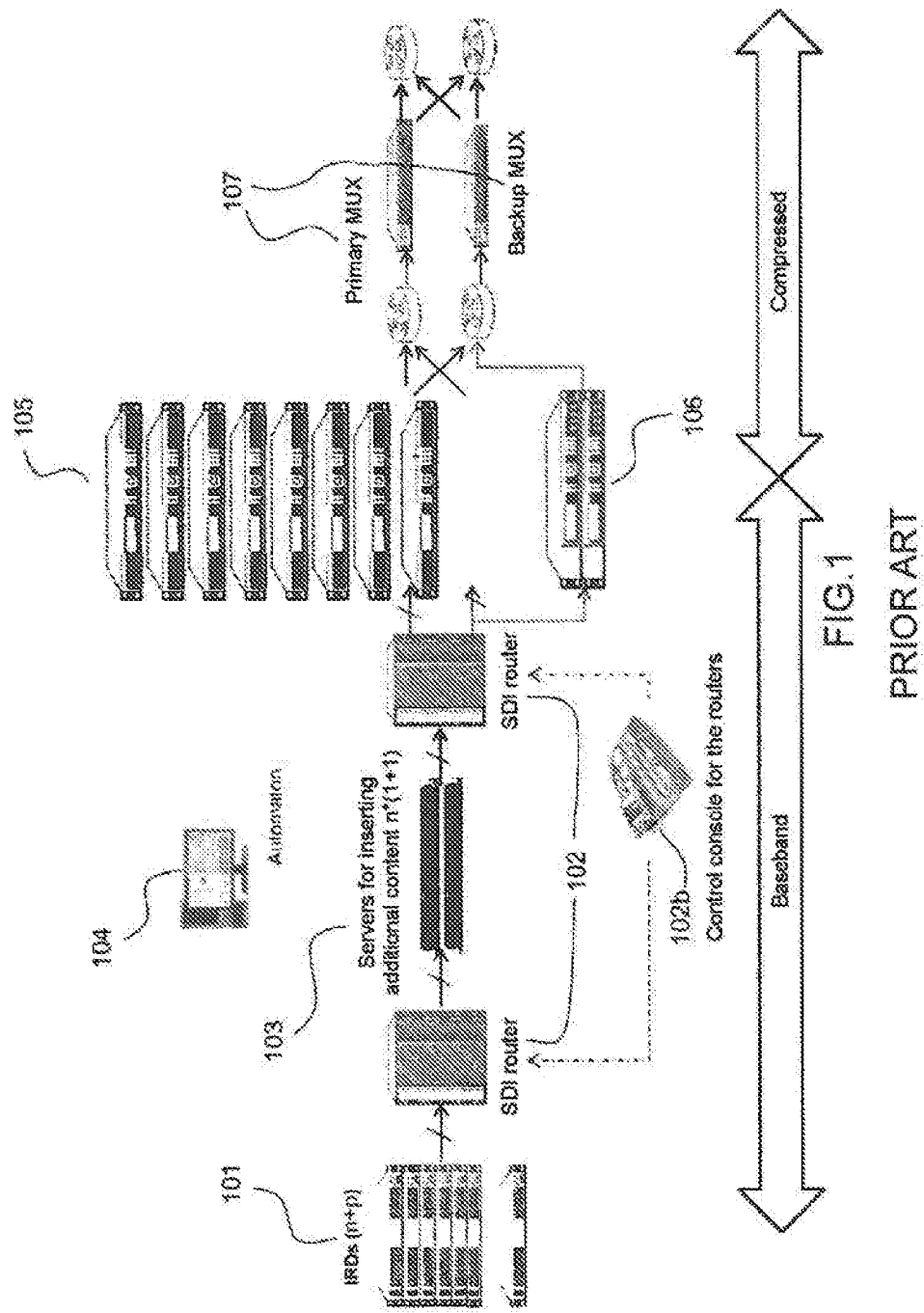
FIG. 1 shows the architecture of a system for broadcasting video programmes from the prior art that operates in baseband.

FIG. 1 shows the architecture of a system for broadcasting video programmes from the prior art that operates in baseband.

It is possible, according to the prior art, to insert additional content in baseband (i.e. in uncompressed mode) by using an architecture that comprises integrated decoders (IRD) 101 (one decoder per content source), routers with a serial communication interface (SDI router) 102 with their control console 102b, a server for inserting additional content 103, a control automaton 104 for servers 103 and the routers 102, a set of coders 105, one per channel, a set of redundant coders 106, in reserve in order to guarantee the high level of availability of the video services, multiplexors (MUX) 107 for sending the content over the various networks.

In this architecture from the prior art, it is sometimes necessary to provide a large number of encoders in order to serve a large number of video services, such as for the satellite broadcast of several hundred video services, for example. Such an architecture does not allow a broadcaster to insert additional programmes under economic conditions, notably when multiple broadcast channels are used. The invention allows this drawback of the prior art to be overcome.

Figure 2A:
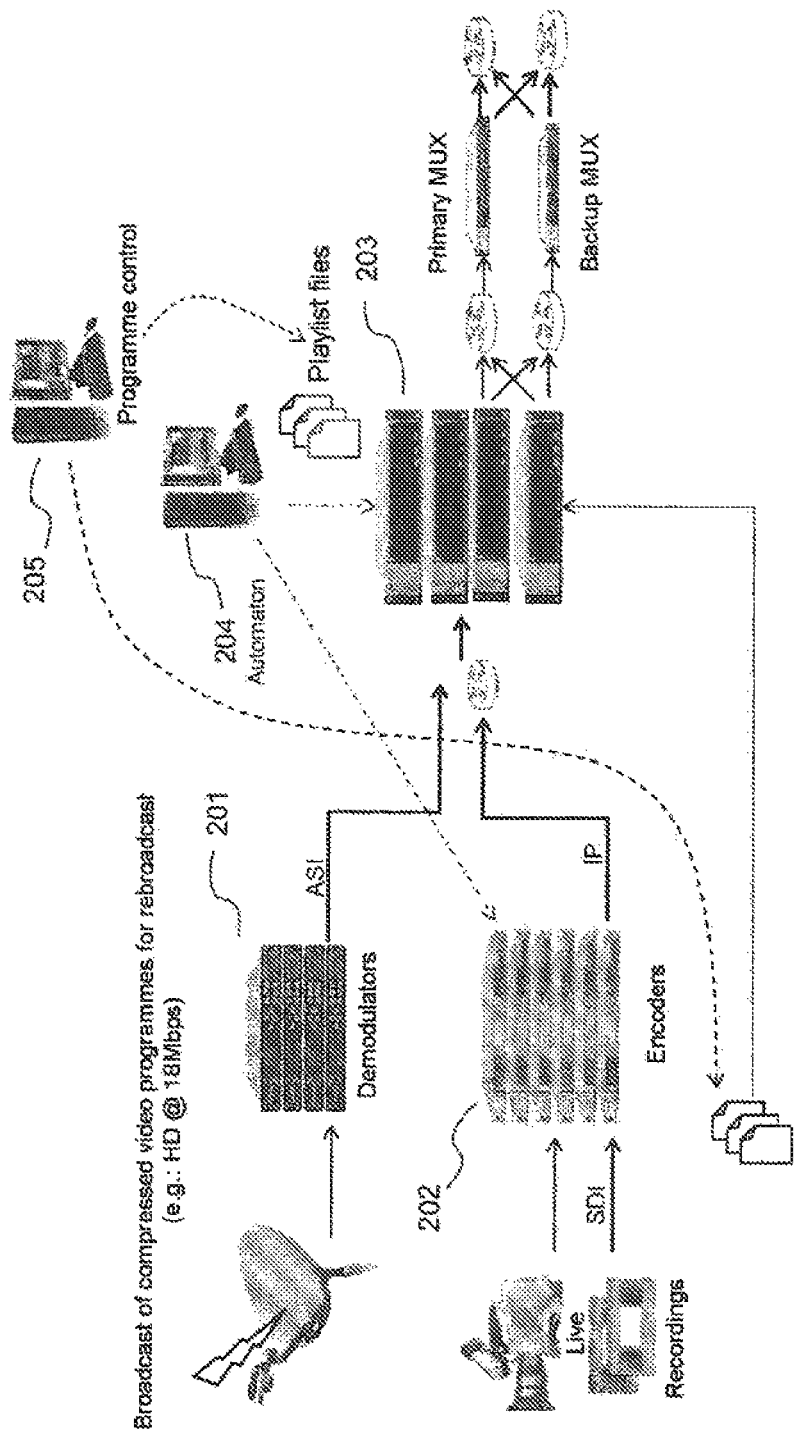
FIGS. 2a and 2b show two architecture variants for a system for broadcasting video programmes from the prior art that operates in compressed mode.
Figure 2B:
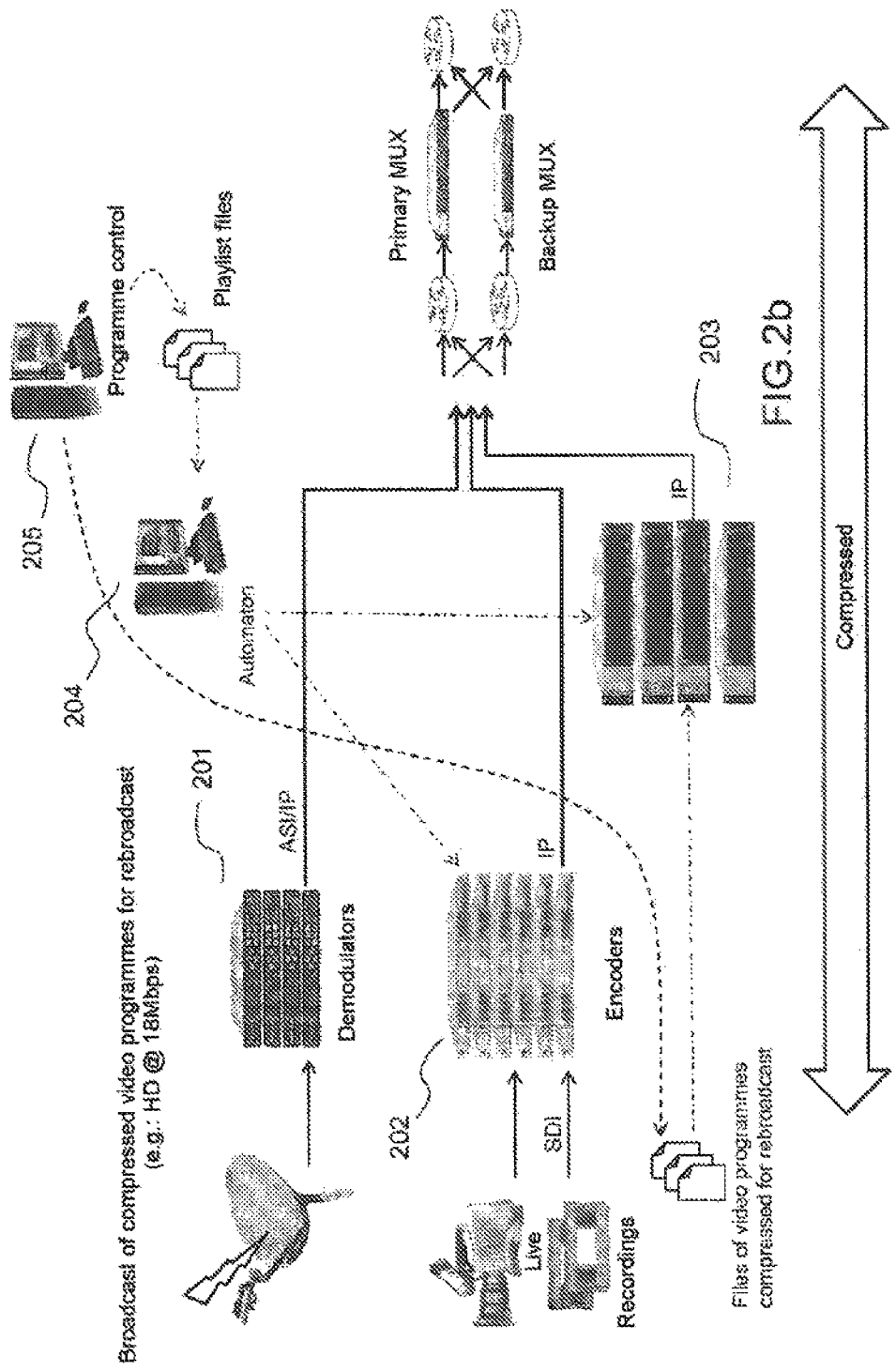

FIGS. 2a and 2b show two architecture variants for a system for broadcasting video programmes from the prior art that operates in compressed mode.

In another architecture from the prior art, additional content is inserted in compressed mode. Demodulators 201 are provided in order to acquire the main programmes into which additional content needs to be inserted. Encoders 202 are provided in order to acquire secondary programmes in baseband. Servers 203 store secondary programmes in the form of compressed video files, the bit rate of which is already suited to broadcasting.

In a $1^{st}$ variant that is illustrated in FIG. 2a, the compressed stream servers receive the main and secondary programmes in order to switch between these main programmes in compressed mode and to insert the secondary programmes stored in the form of compressed video files. In this variant, in the case of the MPEG2 coding standard, it is also possible to partially add secondary graphical content to the resulting programme without decompressing the video content.

In a $2^{nd}$ variant that is illustrated in FIG. 2b, the compressed stream servers do not perform any switching in compressed mode. The switching between the main programmes and the secondary programmes from the encoders 202 or the servers for secondary programmes stored in the form of compressed video files 203, is provided by the programme MUX.

However, the switching/insertion operations cannot be performed in a precise manner. Equally, no information on the additional content is provided for the coder upstream, which has to process the composed content in a traditional manner (i.e. intra-block and inter-block analyses allowing execution of the compression algorithms from the prior art, which will lead to a less than optimum outgoing image quality).

A system for managing traffic comprising a automaton 204 manages the planning of the insertions by controlling the compressed file servers and the encoders.

A system 205 for controlling the streams of main programmes and the streams of additional content is likewise provided. It manages the movement of the programme files to the servers 203. It provides the automation with "playlist" files for planning the programming of the video service.

The present invention allows the drawbacks of the prior art that are described above to be overcome.

Figure 3:
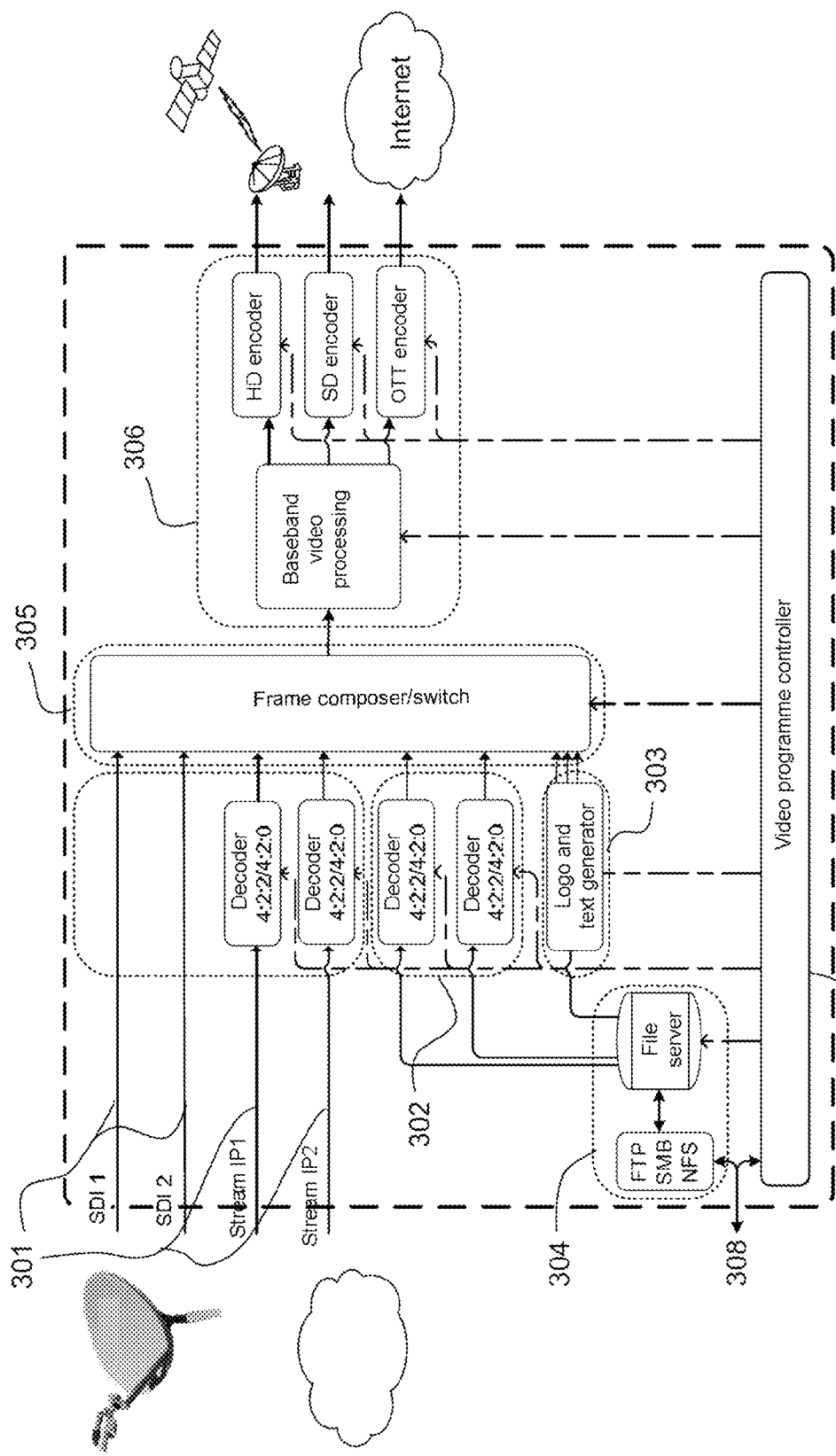
FIG. 3 shows the functional architecture of an integrated encoding device according to an embodiment of the invention.

FIG. 3 shows the functional architecture of an integrated encoding device according to an embodiment of the invention.

In the architecture of the invention, in several of its embodiments, content 301, of diverse origin (SDI streams, IP streams), having main programmes acquired by a broadcaster from diverse content producers, can be integrated with additional content. These streams that arrive on the transport layer in compressed mode are decoded.

Source video streams from additional programmes are stored on the server 304 in a pivot format as has been said, the aim of which is to preserve the quality of the video signal close to the source video signal, while even so being compressed so as to reduce the bit rate thereof significantly in relation to the baseband signal. This means that, in order to feed the image composition function 305, the streams need to be decoded. Two decoding functions are necessary if image-accurate "file to file" switching is intended to be carried out, this operation being able to be performed only in baseband. The reason is that the pivot formats that are generally accepted by broadcasters use MPEG compressed formats requiring groups of images in the order of half a second to a second, which means that it is impossible to switch the compressed signals with image accuracy (but only at a resolution that corresponds to the group of images). The video programmes controller 307 provided with information by the traffic management system 308 knows the name of the clip to be played and the instant at which it needs to be played and will thus control the decoding functions for the streams of main programmes and of additional content in order to provide the signals in baseband for the frame composer 305 at the correct moment to perform the switching with image accuracy, in particular.

A module 303 allows the insertion of content that is constituted by logos and text. In contrast to video streams, which it suffices to decode in a piece of equipment 302, text messages do not constitute a video. It is necessary to transform the sequences of characters that text messages constitute into matrices of video pixels by going through what is known as a character generator, which is included in the module 303, which, through a font in the form of a dot matrix (bit map), will provide the video pixel matrices for each of the characters, which, when themselves juxtaposed, will constitute the text message to be superimposed on the image. This character generator can be parameterized by the video programme controller 307 in order to size the text message in a pixel matrix of a determined size. The same goes for logos, which can be likened to a video pixel matrix with a parameterizable size. For logos, as texts, there may be a piece of transparency information that will be used by the frame composer 305 in order to superimpose the video shots.

A server for additional streams 304 allows several types of video elements to be available in advance. The first type of element is made up of compressed video streams that television operators will charge in advance by using a pivot compression format, the aim of which is to preserve a very high level of quality for the source signal. These streams may correspond to advertising clips, for example, or else films or television series that need to be inserted into the final programme by the frame composer 305 according to planning imposed by the local video programme controller, which is itself controlled by automation and a system for managing external traffic 308. An improvement in the device involves integrating the automation part, in the knowledge that the system for managing external traffic, which provides the equipment with a list of dated instructions, is always external. An interface to an external automation system is therefore necessary and, in a possible embodiment, is based on standardized protocols (SCTE 104) that are suitable because they indicate only the switching instants and not the list of advertising clips to be played. The stream server can likewise be used for broadcasting films, series or more generally any element of commercialized content. One of the difficulties of implementation is arranging for all of the commands that are output by the automation to be orders with a time of application so as to provide maximum decoupling for the internal sequencing (video programme controller) from its environment and to have real time video constraints only inside the equipment, but not in the interface with the automation (as is the case in a traditional installation, which is a drawback of the prior art that is overcome by the invention). The second type of element noted in advance in the server is made up of text messages or even logos. These messages may be static or else animated (for example scroll-down text messages for abduction alert messages, or else text information displayed during the broadcast of a film without interrupting the latter).

The frame composer function 305 receives the main programmes 301, the additional content from the stream server 304 and the video pixel matrices from the graphical generator 303. The frame composer selects and mixes the pixels of the main and additional video frames and the graphical pixel matrices from the graphical generator 303 in order to generate the frames of the video (baseband video) to be encoded in the equipment 306. In one embodiment, the frame composer allows:

selection of the main programme to be broadcast among the sources 301 at the input;

selection of the additional content among the secondary sources 302 at the output of the server 304;

generation of the frames by selecting either the video frames of the main programme or the video frames of the additional content;

positioning and mixing of the pixel matrices from the graphical generator 303, with the pixels of the video frames of the composed video programme.

In another embodiment, it is possible to generate the basic video frames of the composed programme by mixing the pixels of frames of the main programme and of the additional content. It is also possible, before mixing the pixels of the frames, to reduce the dimensions of the frames of one of the programmes (main or secondary). It is also possible, on the basis of a pixel from one of the frames, to position the frames, resized or otherwise, of one programme in relation to the frames of the other programme. It is thus possible to generate video inlays on another video, and shifts from one image to another (shutters).

These different variants are provided purely as an illustration of the embodiments of the frame composition function of the invention. Other possibilities will be able to be derived therefrom by a person skilled in the art by applying his general knowledge.

The video programme controller 307 transmits the following, notably to the frame composer 305:

the mix parameters between the pixels of main and secondary video programmes and the graphical pixels;

the parameters for positioning and moving the video frames and the pixel matrices from the graphical generator (3), the parameters for resizing the video frames and the graphical pixel matrices, such as, for example:

the resulting width, the resulting height or a horizontal/vertical reduction factor;

the original pixel aspect ratio/resulting pixel aspect ratio;

top, bottom, right, left trimming (called "cropping");

parameterization of anti-aliasing and cut-off frequency for the resizing filters.

In this integrated video compression architecture, the functions of preprocessing of the video frames (baseband preprocessing) and of video compression (coder) 306 can benefit from information characterizing the composition of the resulting video programme, said information being provided by a video programme controller 307 that has it available in order to provide temporal and spatial control of the insertions.

By way of example, useful information for the preprocessing and the compression are notably:

the definition of the text areas to be preserved as well as possible by the preprocessing and the compression;

the scroll speed of scrolling text (called "text crawl") in order to optimize the compression;

the definition of the areas of graphics such as logos to be preserved as well as possible by the preprocessing and the compression;

the switching between main and secondary programmes (and vice versa) in order to adapt the strategy of compression and bit rate regulation for the compressed video;

the switching of a video to a fixed graphical image and vice versa in order to adapt the strategy of compression and bit rate regulation for the compressed video.

A person skilled in the art will be able to add to this list on the basis of his general knowledge without departing from the field of application of the invention.

An interface to an external automation system 308 is necessary, and in one possible embodiment is based on standardized protocols (SCTE 104) that specify only video programme change instants. However, it is possible for the video programme change commands to have private extensions (non-normalized) added, which may notably specify:

lists of secondary video file identifiers to be called for this change of programme;

identifiers of graphical files to be composed with the programme in progress;

identifiers of sets of composition parameters, allowing the video programme controller 307 to control the frame composer 305 at the specified programme change instants.

Figure 4:
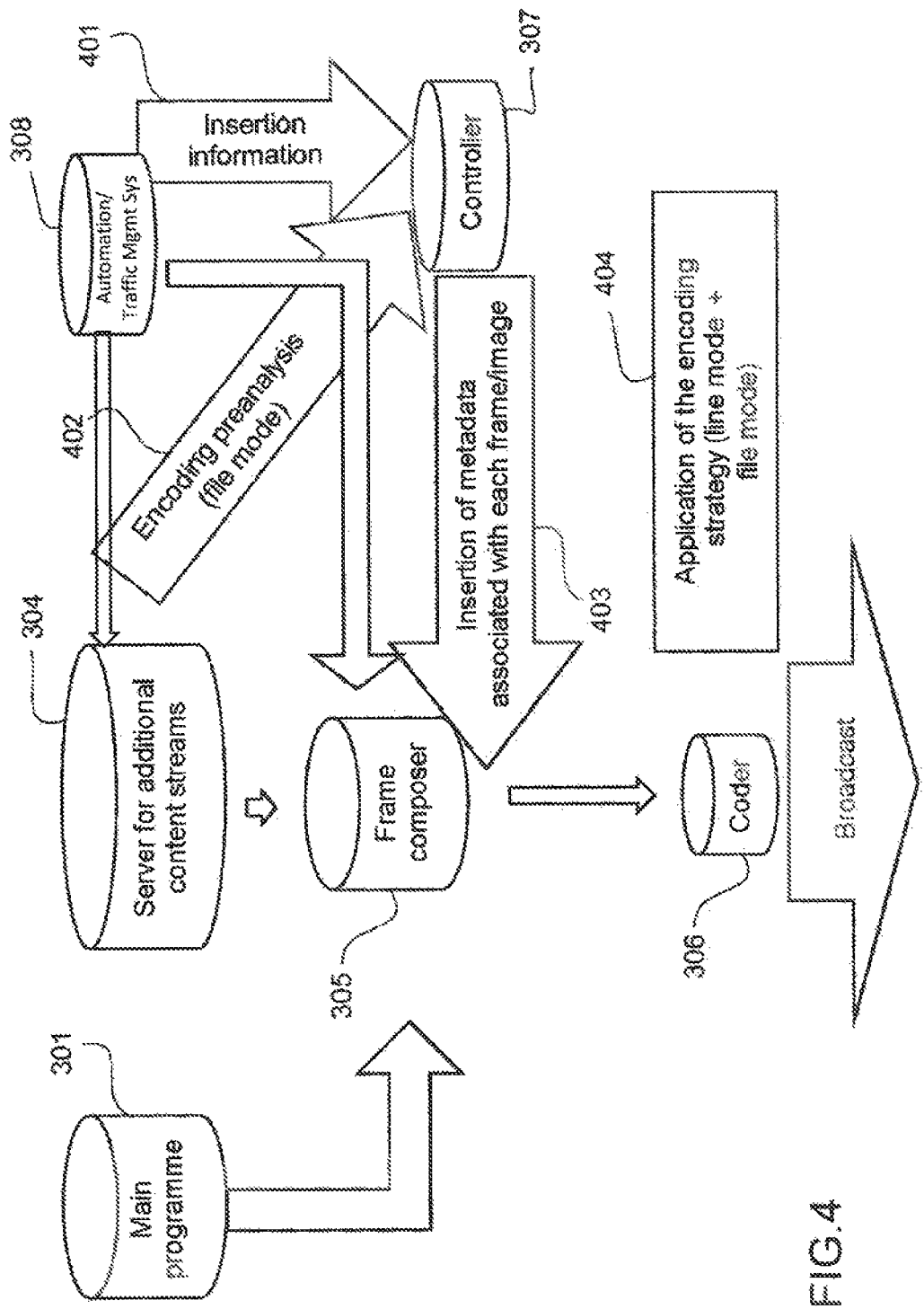
FIG. 4 shows the flowchart for the processing operations of a method for supervising the encoding of composite video programmes according to an embodiment of the invention.

FIG. 4 shows the flowchart for the processing operations of a method for supervising the encoding of composite video programmes according to an embodiment of the invention.

One of the advantages of the architecture of the invention is that it allows the use of information relating to the content and to the positioning of the additional content in order to optimize the encoding strategy. Moreover, the provision of the additional content on the stream server 304 in anticipation in relation to the broadcast of said content allows preanalysis of the content to be performed in file mode in order to deduce therefrom the information to be passed to the coder, which information will allow the optimization of the coding strategy on the additional programme. FIG. 4 schematically indicates the sequencing of the steps allowing this portion of the method of the invention to be performed.

In a step 401, the information concerning planning of the insertion of the secondary programmes into the main programme is conditioned in order to be provided for the coder 306 by the video programme controller 307. Examples of information of this type have been provided above in the comments pertaining to FIG. 3. It is advantageous to insert this information into a metadata item that will then be associated with an image, a block, an image frame from the secondary programme.

By way of addition, but preferentially, in a step 402, which will take place before the period of broadcast of the additional content stored on the server for additional streams 304, preanalysis of the images from said additional content is performed. This analysis therefore takes place in file mode in a similar manner to the method used for encoding files that will be broadcast as video on demand. In particular, it is possible to perform the preanalysis on the whole of the content and therefore to avoid having to repeat several passes in order to take account notably of portions of images that remain fixed over a long period. In line preanalysis mode, it is necessary to resort to several passes, insofar as the depth of analysis is reduced to a few images. The information from this preanalysis step is appended to the metadata at the output of step 402.

The metadata at the output of step 402 are associated with the relevant level of a set of images in the frame composer 305 in the course of a step 403.

The metadata are used by the coder 306 in the course of a step 404. In some embodiments, the coding is performed in line mode for the portion of the composed programme from the main programme and in file mode for the portion of the composed programme from the secondary programme. In this case, two separate processes are carried out in succession by the coder. The process of line coding uses the portion of the metadata that is associated with the frame that contains the temporal and spatial position information and the transition information for the inlays. In other embodiments, in which a secondary programme and a main programme are able to coexist on one and the same screen, either permanently or for a transition, the two line coding and file coding processes are executed as a function of the portion of the image that is processed by the coder.

The examples described above are provided by way of illustration of embodiments of the invention. They do not in any way limit the field of the invention, which is defined by the claims that follow.

The invention claimed is:

1. Broadcasting device for broadcasting video programmes comprising:

at least one acquisition module for acquiring at least one main programme;

at least one production module for producing at least one additional element chosen from a group comprising a secondary programme and an inlay;

at least one composition module for composing a programme composed from said at least one additional element and said at least one main programme;

at least one coding module for broadcasting said video programme at the output of the composing module over at least one transmission network for video signals;

wherein the composition module processes the images of the at least one main programme and of the at least one additional element in uncompressed format and the production, composition and coding modules are supervised by a common control module; and wherein the common control module is configured to receive information associated with planning of the composing and decoding of the at least one main programme and the at least one additional element from an automaton and to condition said information into metadata that are provided to the coding module, and the coding module is configured to receive said metadata as an input and to deduce therefrom a coding strategy for the composed programme.

2. The broadcasting device of claim 1, wherein the acquisition module comprises at least one decoding submodule for decoding the at least one main programme.

3. The broadcasting device claim 2, wherein the at least one decoding submodule is configured to perform multiple decoding.

4. The broadcasting device of claim 1, wherein the production module comprises a submodule for generating graphical and textual content and a submodule for superimposing said generated content in a main or secondary video programme.

5. The broadcasting device of claim 1, wherein said metadata comprise elements chosen from a group of data comprising information about a start time, an end time, a position, an occupied surface area, a level of transparency of said at least one additional element.

6. The broadcasting device of claim 1, wherein the production module comprises a submodule for analysing image files constituting additional elements, said image analysis submodule being configured to produce metadata associated with the images of the additional elements, said metadata comprising information concerning intra-image content and estimation of inter-image movement of said additional elements.

7. The broadcasting device of claim 6, wherein the image analysis submodule is configured to perform said analysis on all of the additional elements intended for broadcast with a main programme, prior to said broadcast.

8. The broadcasting device of claim 1, wherein the coding module implements at least one coding process, said at least one coding process being chosen from a group comprising line coding processes and file coding processes.

9. The broadcasting device of claim 1, said broadcasting device being configured to receive the video programmes encapsulated in IP frames and to retransmit them in the same format.

10. The broadcasting device of claim 1, wherein the metadata comprising a scroll speed of scrolling text comprised in said at least one additional element.

11. Broadcasting method for broadcasting video programmes comprising:
    at least one step of acquisition of at least one main programme;
    at least one step of production of at least one additional element chosen from a group comprising a secondary programme and an inlay;
    at least one step of composition of a programme composed from said at least one additional element and said at least one main programme;
    at least one step of coding for broadcasting said video programme at the output of the step of composition over at least one transmission network for video signals;
    wherein the composition step processes the images of the at least one main programme and of the at least one additional element in uncompressed format and in that the production, composition and coding steps are supervised by a common control step; and wherein the common control module is configured to receive information associated with planning of the composition step and decoding of the at least one main programme and the at least one additional element from an automaton and to condition said information into metadata that are provided to the coding module, and the coding module is configured to receive said metadata as an input and to deduce therefrom a coding strategy for the composed programme.

12. The broadcasting method of claim 11, wherein the metadata comprising a scroll speed of scrolling text comprised in said at least one additional element.

* * * * *